INVENTORS
L.O. LARSEN
R.E. REED
BY J. J. Landis
ATTORNEY

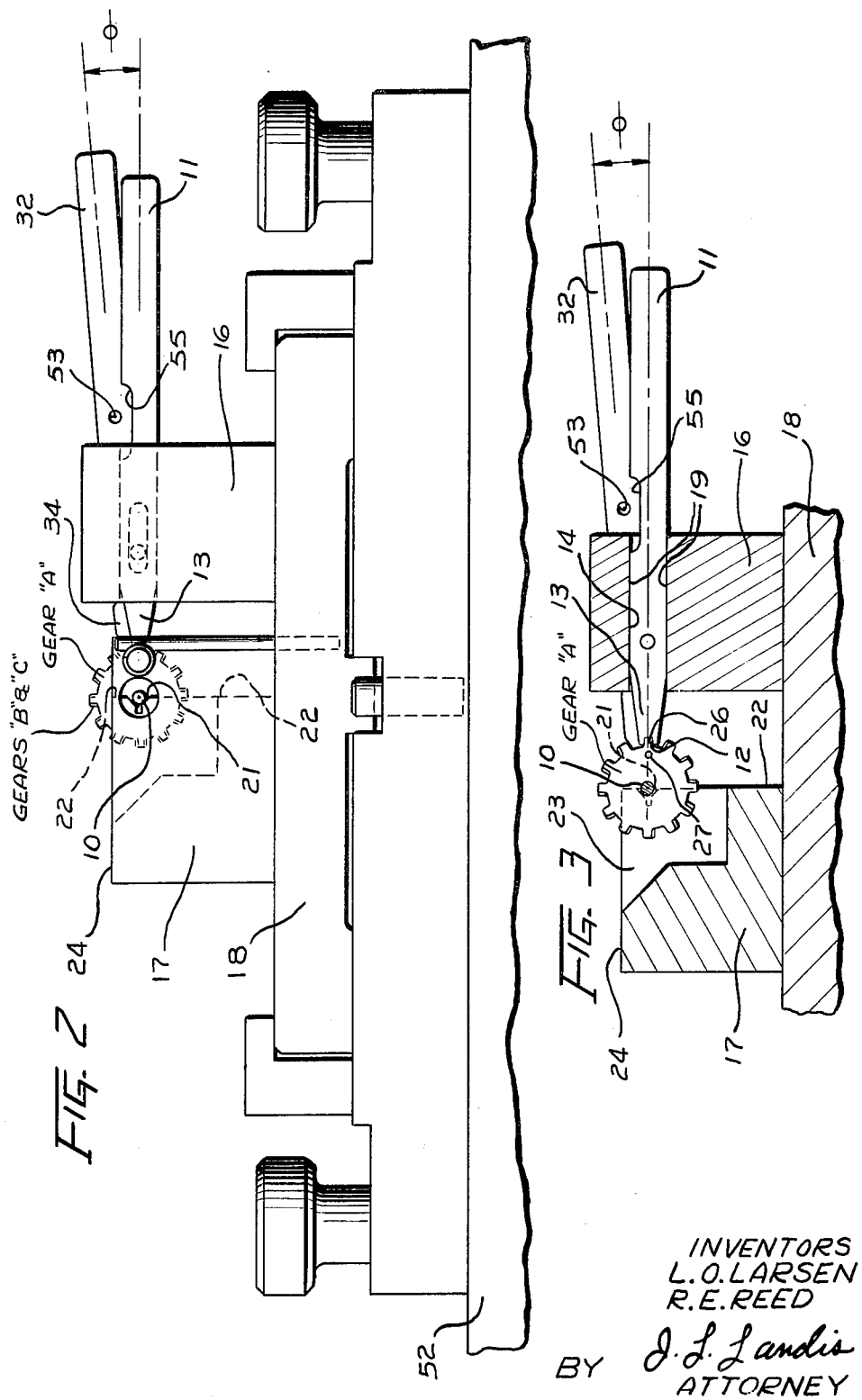

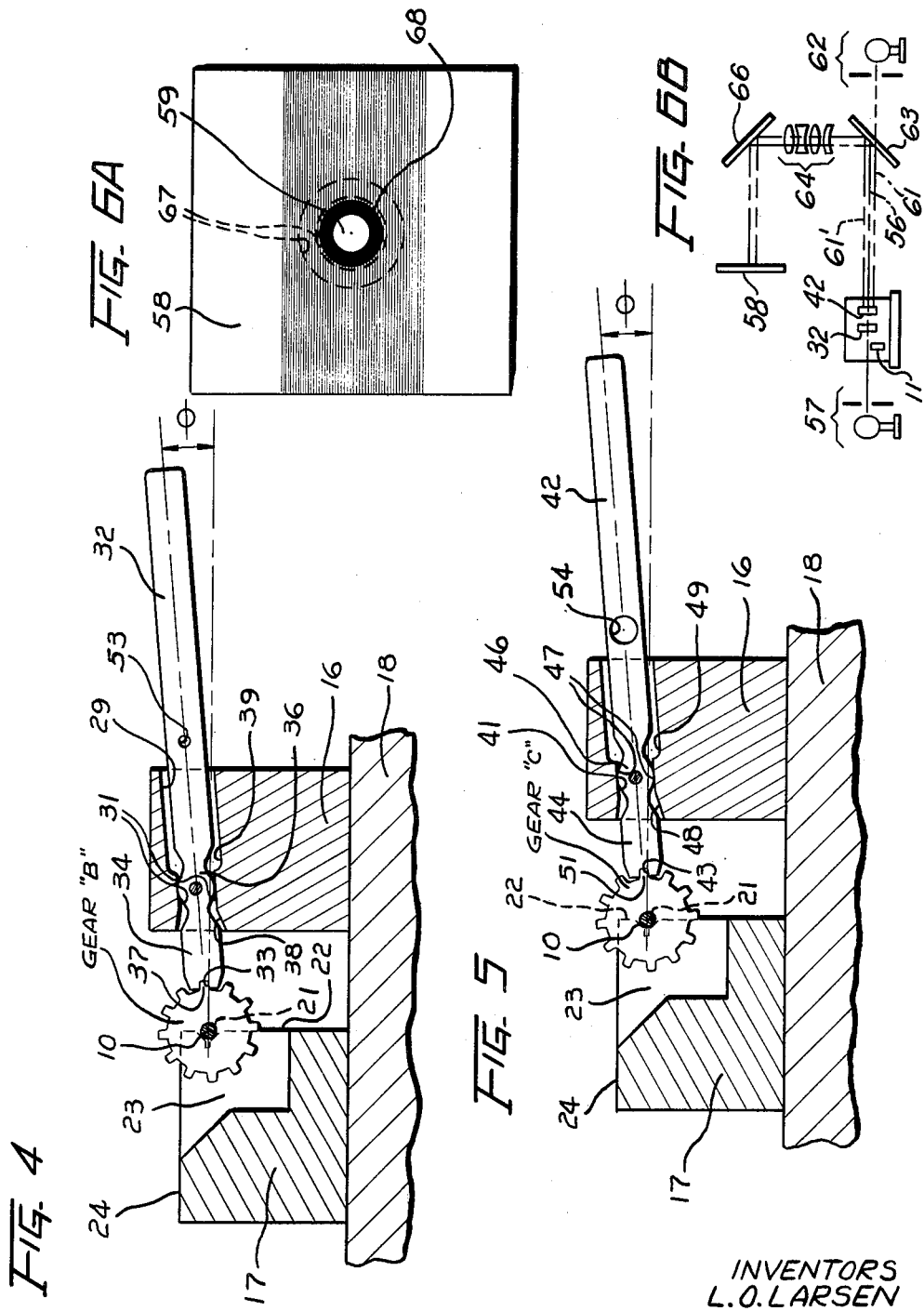

3,216,123
APPARATUS FOR INDICATING DEVIATIONS IN THE RELATIVE ANGULARITY OF SPACED PROJECTIONS ON A COMMON SHAFT
Leonard O. Larsen and Robert E. Reed, Indianapolis, Ind., assignors to Western Electric Company, Incorporated, a corporation of New York
Filed Aug. 9, 1961, Ser. No. 130,378
6 Claims. (Cl. 33—181)

The present invention relates generally to apparatus for indicating deviations in the relative angularity of spaced projections on a common shaft, and more particularly to the utilization of such apparatus for indicating deviations in the relative angularity of spaced gears mounted on a common shaft. Accordingly, the general objects of the invention are to provide new and improved apparatus of such character.

In any application where projections on a common shaft have an angular disposition around the shaft which is offset relative to at least one other projection, it is often necessary that deviations from a desired relative angularity be easily and accurately observed. The particular application contemplated is that of spaced gears on a common shaft which are angularly offset relative to each other in order to transmit motion in offset synchronism. A specific example of a situation in which such offset synchronism is necessary is a telephone, where, of necessity, the instrument must be compact despite its complexity. For this reason, individual gear trains driven by a common shaft transmitting rotational movement of the dial are angularly offset relative to each other in conformity to the available space; however, the same tooth on each gear must mesh with its associated gear in synchronism in order to accurately transmit a dialed number. To this end the relative angularity between the gears must be within certain tolerances.

Therefore, a more specific object of the invention is to provide new and improved apparatus for indicating deviations in the relative angularity of two spaced gears mounted on a common shaft, which indicated deviations can be easily and accurately observed to determine whether the relative angularity is within prescribed tolerances.

With the foregoing and other objects in mind, and in accordance with certain aspects of the invention, deviations in the relative angularity of spaced projections on a common shaft are indicated while the shaft is supported with a selected one of the projections in a predetermined angular position by a supporting mechanism. A pivotal lever having a recess at one end of mating contour with respect to a second one of the projections is slidable toward and away from the second projection in radial alignment with a predetermined correct position of the second projection and the center of the shaft. As the lever is advanced to and engaged with the second projection, the lever may pivot, as required, to accurately accommodate the projection in the recess. This pivotal movement from the predetermined correct position provides an indication of deviations in the relative angularity of the first and second projections.

According to certain more specific aspects of the invention, deviations in the relative angularity of spaced gears mounted on a common shaft are indicated. A first lever, having a recess at one end of mating contour with respect to a tooth on a selected one of the gears, is received in a slot extending through an upright standard. The slot is formed by opposed parallel surfaces defining a horizontal path for sliding movement of the first lever, which lever is slid forward therein to engage a selected one of the teeth on the first gear and to thereby support the shaft against the supporting mechanism with the first gear in a predetermined angular position.

A second lever is provided, having a recess at one end of mating contour with respect to a tooth on a second one of the gears. The second lever has an enlarged cylindrical portion intermediate the ends thereof oriented transversely with respect to the longitudinal axis of the lever, which cylindrical portion is received in a second slot extending through the upright standard. The second slot, having flared openings leading thereto and therefrom, is formed by opposed parallel surfaces defining a path for sliding movement of the second lever at an angle relative to the path of the first lever which corresponds to the correct angularity of the second gear with respect to the first gear. The cylindrical portion of the second lever cooperates with the vertically opposed surfaces of the second slot to form a fulcrum about which the second lever may pivot, facilitated by the flared openings of the slot, in the plane of the second gear, as required, to accurately accommodate the tooth when engaged therewith. This pivotal movement of the second lever out of alignment with the predetermined correct relative angularity of the first and second gears provides an indication of deviations from that angularity.

Other objects, advantages, and aspects of the invention will appear from the following detailed description of a specific embodiment thereof, when taken in conjunction with the appended drawings, in which:

FIG. 2 is a front view of the apparatus depicted in FIG. 1;

FIG. 3 is a fragmentary vertical cross section taken generally along line 3—3 in FIG. 1 and showing a preferred supporting mechanism;

FIG. 4 is a fragmentary vertical cross section taken generally along the line 4—4 in FIG. 1 and showing a preferred pivotal lever;

FIG. 5 is a fragmentary vertical cross section taken generally along line 5—5 in FIG. 1 and also showing the preferred pivotal lever; and FIG. 6A is front view of an optical comparator screen; and FIG. 6B is a diagrammatic view of an optical system for the preferred embodiment.

Figure 1:
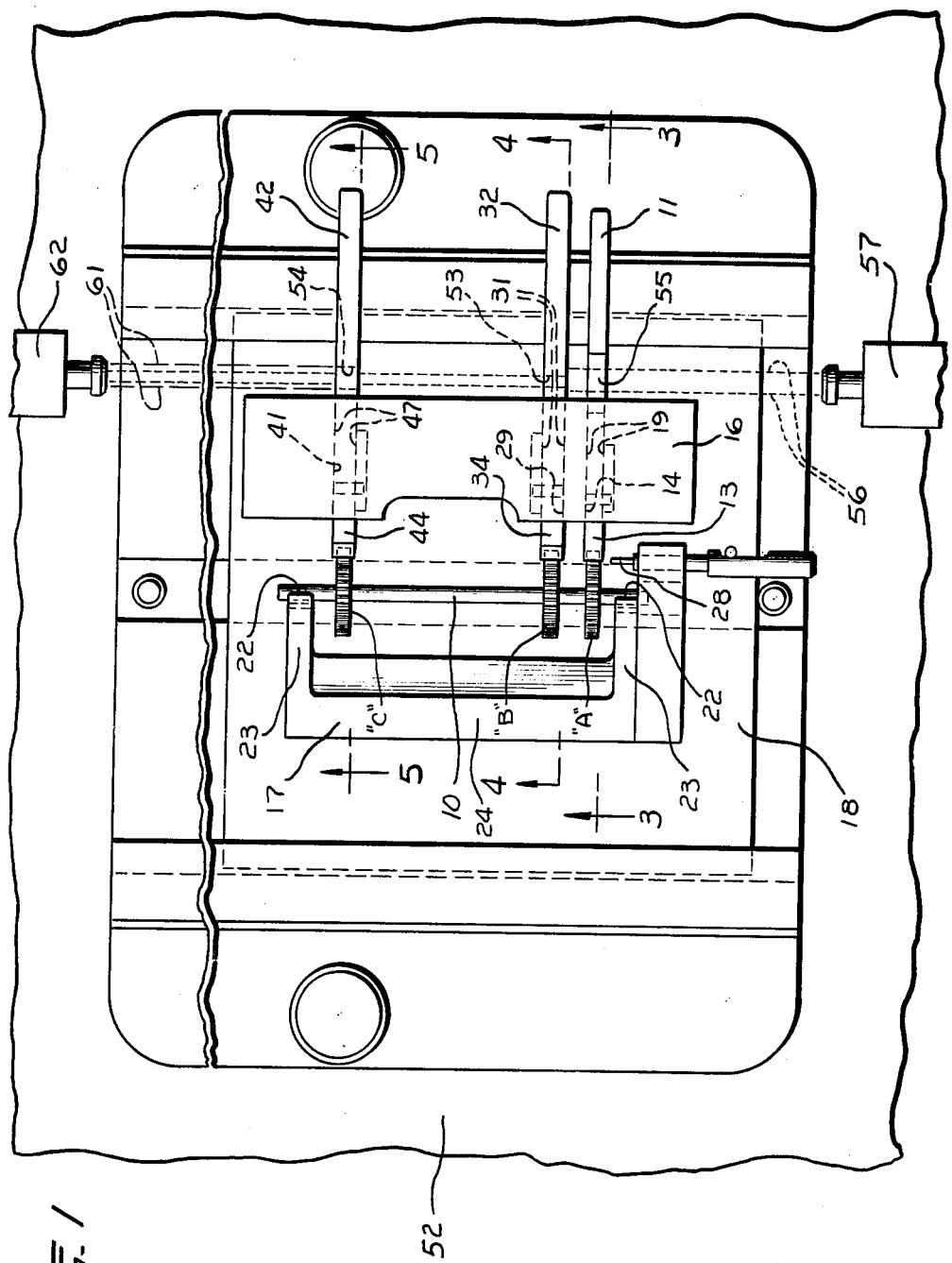
FIG. 1 is a plan view of apparatus for indicating deviations in the relative angularity of three spaced gears on a common shaft in accordance with a preferred embodiment of the invention.

Referring now in detail to the drawings and particularly to FIG. 1, there is illustrated one specific embodiment of the invention in which deviations in the relative angularity of three spaced gears A, B, and C mounted on a common shaft 10 are to be indicated. A first lever 11, (FIGS. 1, 2, and 3) having a recess 12 at one end 13 of mating contour with respect to a tooth on the first gear A, is slidably received in a slot 14 extending through a first upright standard 16, which standard 16 is mounted in opposed relationship with a second upright standard 17 on a base 18.

The first lever 11 is slid forward along a path defined by opposed parallel surfaces 19—19, forming the slot 14 as is best seen in FIG. 3, in horizontal alignment with the center of the shaft 10 being held in a V-shaped notch 21 extending horizontally across the front surface 22 of each arm 23 of a bifurcated upper end 24 of the second standard 17. A selected tooth 26 on the first gear A, indicated by a bore 27 adjacent to the tooth 26, is held in alignment with the path of the first lever 11 by a pin 28, slidably mounted on the second standard 17, which is inserted in the bore 27. As the first lever 11 is slid forward, it engages and accommodates the tooth 26 in the recess 12 thereby to support the shaft 10, with the first gear A in a predetermined angular position, against the notches 21—21 in the second standard 17.

The first standard 16 is provided with a second slot 29 (FIG. 1) spaced the same distance from the first slot 14 as the second gear B is spaced from the first gear A. Referring now to FIG. 4, the slot 29 is formed by opposed parallel surfaces 31—31 defining a path for a second lever 32 at an angle θ relative to the path of the first lever 11 (see also FIG. 2) which corresponds to the correct angularity of the second gear B with respect to the first gear A. The second lever 32 is provided with a recess 33 at one end 34 of mating contour with respect to a tooth on the second gear B, and an enlarged cylindrical portion 36 intermediate the ends thereof oriented transversely with respect to the longitudinal axis of the second lever 32.

With the first gear A clamped by the first lever 11 (FIG. 2), the second lever 32 is slid forward in the second slot 29 in radial alignment with the predetermined correct angularity of a tooth 37 on the second gear B, corresponding to the selected tooth 26 on the first gear A, to engage the tooth 37 as shown in FIG. 4. Flared openings 38 and 39 leading to and from the second slot 29 permit the second lever 32 to pivot about a fulcrum, formed by the cylindrical portion 36 thereof within the second slot 29, in the plane of the second gear B, as required, to accommodate accurately the tooth 37 in the recess 33. This pivotal movement of the second lever 32 out of alignment with the predetermined correct relative angularity θ of the first and second gears A and B provides an indication of deviations from that angularity.

A third slot 41 (FIGS. 1 and 5) in the first standard 16 is spaced the same distance from the second slot 29 as the third gear C is spaced from the second gear B. A third lever 42 is slidably received in the third slot 41. The lever 42 is formed with a recess 43 at one end 44 of mating contour with respect to a tooth on the third gear C and with an enlarged cylindrical portion 46 intermediate the ends thereof oriented transversely with respect to the longitudinal axis of the lever 42.

The third lever 42 is slid forward along a path defined by opposed parallel surfaces 47—47, forming the third slot 41 as is best seen in FIG. 5, at the same angle θ relative to the path of the first lever 11 which corresponds to the correct angularity of the third gear C with respect to the first gear A. Flared openings 48 and 49 leading to and from the third slot 41 permit the lever 42 to pivot about a fulcrum, formed by the cylindrical portion 46 thereof within the third slot 41, in the plane of the third gear C, as required, to accommodate accurately a tooth 51, corresponding to the selected tooth 26 on the first gear A, in the recess 43 when engaged therewith. This pivotal movement of the third lever 42 out of alignment with the predetermined correct relative angularity θ of the first and third gears A and C provides an indication of deviations from that angularity.

In the illustrative embodiment of the invention, the second and third gears B and C are nominally of identical angularity θ relative to the first gear A; however, the invention may easily be utilized where the angles are different from each other. While any angular misalignment could be detected visually or by various conventional devices for indicating any pivotal movement of the second and third levers 32 and 42, an optical comparator 52 is preferred for simple and accurate gaging.

To this end, a small bore 53 is provided in the second lever 32 and a large bore 54 is provided in the third lever 42. The small bore 53 and the large bore 54 are normally aligned parallel to the axis of the shaft 10 and the first lever 11 is recessed as indicated by the numeral 55 in FIGS. 2 and 3, so that a beam of parallel light rays 56—56 directed from a first light source 57 within the optical comparator 52 passes through the recess 55 and through both the small bore 53 and the large bore 54, in the manner shown in FIGS. 1 and 6B, if the angularity of the second and third gears B and C is reasonably correct.

Those light rays 56—56 which pass through the small bore 53 and the large bore 54 are magnified by the optical system (FIG. 6B) of the comparator 52 and are projected onto a comparator screen 58 (FIG. 6A). The position of the second lever 32 is indicated by a spot of light 59, collimated by the small bore 53, on the optical comparator screen 58.

A second beam of parallel light rays 61—61 (FIGS. 1 and 6B) directed from a second light source 62, mounted within the optical comparator 52 on the opposite side of the levers 11, 32, and 42 from the first source 57, is incident on the third lever 42. The light rays of the second source 62 are reflected by the third lever 42, magnified by the optical system (FIG. 6B) and also projected onto the screen 58 (FIG. 6A) where the reflected light rays appear as a gray image of the third lever. The large bore 54 in the third lever 42 is indicated by a dark ring 68 on the optical comparator screen 58 resulting from those light rays 61—61 which pass through the large bore 54 and therefore are not reflected.

Various optical comparators are well known and commerically available which are capable of simultaneously reflecting light from an object to illuminate a surface thereof and projecting light around the object to silhouette the peripheral contour thereof. The particular optical comparator employed in the above embodiment is known commercially as a Kodak Contour Projector, model No. 14-24, with a Surface Illumination Attachment, manufactured by the Eastman Kodak Company, Rochester, New York, a corporation of New Jersey. A similar comparator is disclosed in Patent No. 2,064,368, issued to E. Bausch and H. F. Kurtz on December 15, 1936 for a Projection Apparatus, assigned to the Bausch and Lomb Optical Company, Rochester, New York, a corporation of New York.

For purposes of illustration, a simplified version of one such optical system is depicted diagrammatically in FIG. 6B, it being noted that specific details of a more sophisticated comparator may be obtained by consulting the above patent. The light rays 56 of the first source 57, which pass through the small bore 56 in the second lever 32, are reflected by a mirror 63, magnified by a system of lenses 64 and reflected by a second mirror 66 onto the screen 58. The light rays 61 of the second source 62 are reflected by the adjacent surface of the third lever 42, and the reflected light rays 61' are reflected by the mirror 63, magnified by the lens system 64, and finally reflected by the second mirror 66 onto the screen 58. The resulting image on the screen 58, shown in FIG. 6A, consists of a dark ring 68 within a surface reflection of the third lever 42, resulting from the passage of light through the large bore 54 therein, and a bright spot 59, effected by the light passing through the small bore 53 in the second lever 32.

Thus, the position of the second lever 32 is indicated by the spot of light 59 and the position of the third lever 42 is indicated by a dark ring 68 surrounding the spot 52 within the gray area of light reflected from the third lever 42. The positions of the bores 53 and 54 of the second and third levers 32 and 42 may be compared with the correct positions therefor, indicated on the optical screen 58 by tolerance limits 67—67, when the selected tooth 26 on gear A is engaged by the first lever 11. In this manner, the relative angularity of the second and third gears B and C with respect to the first gear A may easily and accurately be observed on the optical comparator screen 58, and those gear and shaft combinations which do not fall within the tolerance limits 63 can be rejected.

While the specific embodiment of the invention described hereinabove is designed to indicate deviations in the relative angularity of three spaced gears on a shaft, it is obvious that two spaced gears on a shaft may be investigated with even greater ease. To accomplish this, the third lever 42 is removed from the first standard 16 and only the first and sceond levers 11 and 32 utilized.

The spot of light 59 would then be visible alone on the optical comparator screen 58 and could be viewed with ease to determine deviations in the relative angularity of the two gears.

The relative angularity of a plurality of spaced projections on a common shaft may also be investigated in this manner. Although the construction of the first and second standards might vary for this application, that of the levers would remain essentially the same. The first lever would have a recess at one end of mating contour with respect to a selected one of the projections and would hold that projection in a predetermined angular position. The remaining projections would be associated with levers essentially identical to the above-mentioned second and third levers, except that again the recess in the end adjacent to the associated projection would be of mating contour with respect to that projection. The pivotal movement of these levers out of alignment with the predetermined correct relative angularity of the associated projections would be indicative of deviations from that angularity.

While one specific embodiment of the invention has been described in detail hereinabove, it will be obvious that various modifications may be made without departing from the spirit and scope of the invention.

What is claimed is:

1. Apparatus for indicating deviations in the relative angularity of spaced projections on a common shaft, which comprises means for supporting the shaft with a selected one of the projections in a predetermined angular position; and a pivotal lever having a recess at one end of mating contour with respect to a second one of the projections, said pivotal lever being slidable toward and away from the second projection in radial alignment with a predetermined correct position of the second projection and the center of the shaft; whereby, as said lever is advanced into engagement with the second projection, said lever may pivot, as required, to accommodate accurately the projection in the recess, which pivotal movement from the predetermined correct position provides an indication of deviations in the relative angularity of the first and second projections.

2. Apparatus for indicating deviations in the relative angularity of a plurality of spaced projections on a common shaft, which comprises means for supporting the shaft with a selected one of the projections in a predetermined angular position; a plurality of pivotal levers, each lever having a recess at an end adjacent to an associated one of the remaining projections of mating contour with respect to the associated projection and each lever being slidable toward and away from the associated projection in radial alignment with a predetermined correct position of the projection and the center of the shaft, whereby as each lever is advanced into engagement with the associated projection, the lever may pivot, as required, to accommodate accurately the projection in the recess, which pivotal movement of each lever from the predetermined correct position provides an indication of deviations in the relative angularity of the associated projection; and optical means for simultaneously indicating the final angular position of each lever.

3. The apparatus as recited in claim 1, wherein an upright standard is provided, having flared openings leading to and from a slot extending therethrough, the slot being formed by opposed parallel surfaces defining a path, in radial alignment with the predetermined correct position of the second projection and the center of the shaft, for the sliding movement of the pivotal lever which is received in the slot; and wherein the pivotal lever is provided with an enlarged cylindrical portion intermediate the ends thereof which is substantially equal in size to the slot in said standard and is oriented transversely with respect to the longitudinal axis of the lever, whereby the cylindrical portion forms a fulcrum about which the lever may pivot within the slot, facilitated by the flared openings thereof, in the plane of the second projection, as required to accommodate accurately the projection in the recess.

4. The apparatus as recited in claim 3, wherein optical means are provided for displaying comparatively on a screen the position of the lever with respect to a predetermined correct position thereof, while the second projection is accurately accommodated in the mating recess in the lever.

5. Apparatus for use in conjunction with an optical comparator to indicate deviations in the relatively angularity of two spaced gears mounted on a common shaft, which comprises a first lever having a recess at one end of mating contour with respect to a tooth on a first one of the gears; a second lever having a recess at one end of mating contour with respect to a tooth on the second one of the gears, an enlarged cylindrical portion intermediate the ends of said second lever oriented transversely with respect to the longitudinal axis thereof, and a small bore near the remote end thereof extending transversely therethrough; a first upright standard having a pair of slots extending therethrough which are spaced the same distance apart as the gears on the shaft, a first one of the slots being formed by opposed parallel surfaces defining a horizontal path for sliding movement of said first lever which is received therein, and the second one of the slots being formed by opposed parallel surfaces defining a path for sliding movement of said second lever which is received therein and having flared openings leading thereto and therefrom, the path of said second lever being at an angle relative to the path of said first lever which corresponds to the correct angularity of the second gear with respect to the first gear; a second upright standard having a bifurcated upper end with a V-shaped notch extending horizontally across the front surface of each arm thereof, the notches being designed to receive the shaft with the two spaced gears between the arms of the bifurcated end; a base on which said first and second standards are mounted in opposed relationship with the notches in said second standard facing the slots in said first standard so that, when the shaft is received in the notches, said first lever may be slid forward in the first slot in horizontal alignment with the center of the shaft to engage a selected one of the teeth on the first gear and to thereby support the shaft with the first gear in a predetermined angular position, and said second lever may then be slid forward in the second slot in radial alignment with the predetermined correct angularity of a tooth on the second gear, corresponding to the selected tooth on the first gear, to engage the tooth, at which time said second lever may pivot about a fulcrum formed by the cylindrical portion of said second lever within the second slot, facilitated by the flared openings thereof, in the plane of the second gear, as required, to accommodate accurately the tooth in the recess, which pivotal movement of said second lever out of alignment with the predetermined correct relative angularity of the second gear provides an indication of deviations from this angularity; whereby a beam of parallel light rays which is directed from a source in the optical comparator perpendicular to said second lever and which passes through the bore in said second lever is magnified by the optical system and projected onto a screen of the optical comparator for comparison with an indicated correct position on the screen so that deviations in the relative angularity of the teeth on the two gears may be optically observed.

6. The apparatus as recited in claim 5, wherein deviations in the relative angularity of three spaced gears on a common shaft is to be indicated, the second and third gears being nominally offset by the same angle $\theta$ from the first gear; wherein the first lever is associated with the first gear on the shaft, the second lever is associated with the second gear on the shaft, and a third lever is provided which corresponds to the second lever and is slidably received in a third slot in the first upright standard, the third lever having a large bore near the remote end thereof extending transversely therethrough and normally aligned with the small bore in the second lever; whereby a beam of parallel light rays which is directed from a second source in the optical comparator opposite the first source and which is reflected by the lever except for said third portion passing through the large bore therein so that a dark spot appears on the screen as the image of the large bore for comparison with an indicated correct position therefor, the second lever and said third lever having generally similar angularities so that light which passes from the first source through the small bore in the second lever also passes through the large bore in said third lever despite minor deviations in the relative angularity of the second and third gears and appears as a small spot of light within the dark spot.

No references cited.

ISAAC LISANN, *Primary Examiner.*